United States Patent
Pal et al.

(10) Patent No.: US 9,767,622 B2
(45) Date of Patent: Sep. 19, 2017

(54) SYSTEM AND A METHOD FOR IMPROVED CAR PROGNOSIS

(71) Applicant: TATA CONSULTANCY SERVICES LIMITED, Maharashtra (IN)

(72) Inventors: Arpan Pal, West Bengal (IN); Chirabrata Bhaumik, West Bengal (IN); Kallol Ghosh, West Bengal (IN); Provat Biswas, West Bengal (IN); Aniruddha Sinha, West Bengal (IN); Tanushyam Chattopadhyay, West Bengal (IN); Arijit Sinharay, West Bengal (IN); Mohd Bilal Arif Syed, West Bengal (IN)

(73) Assignee: TATA CONSULTANCY SERVICES LIMITED, Maharashtra (IN)

( * ) Notice: Subject to any disclaimer, the term of this patent is extended or adjusted under 35 U.S.C. 154(b) by 62 days.

(21) Appl. No.: 14/386,315

(22) PCT Filed: Mar. 5, 2013

(86) PCT No.: PCT/IN2013/000133
§ 371 (c)(1),
(2) Date: Sep. 18, 2014

(87) PCT Pub. No.: WO2013/160908
PCT Pub. Date: Oct. 31, 2013

(65) Prior Publication Data
US 2015/0051785 A1    Feb. 19, 2015

(30) Foreign Application Priority Data
Mar. 22, 2012 (IN) ............................. 773/MUM/2012

(51) Int. Cl.
*G07C 5/00* (2006.01)
*G01P 15/18* (2013.01)
(Continued)

(52) U.S. Cl.
CPC ............. *G07C 5/008* (2013.01); *B60W 40/06* (2013.01); *B60W 50/14* (2013.01); *G01P 15/18* (2013.01);
(Continued)

(58) Field of Classification Search
None
See application file for complete search history.

(56) References Cited

U.S. PATENT DOCUMENTS

| 4,908,767 A | 3/1990 | Scholl et al. |
| 7,421,321 B2 | 9/2008 | Breed et al. |

(Continued)

FOREIGN PATENT DOCUMENTS

WO    2010/062899 A1    6/2010

OTHER PUBLICATIONS

International Search Report for corresponding International Application No. PCT/IN2013/000133, dated Jan. 30, 2014, 2 pages.

(Continued)

*Primary Examiner* — Rami Khatib
*Assistant Examiner* — Nicholas K Wiltey
(74) *Attorney, Agent, or Firm* — Ditthavong & Steiner, P.C.

(57) ABSTRACT

A system and method for a real-time prognosis of a vehicle comprising a personal communication device comprising an arbitrarily oriented three-axis accelerometer configured to capture a pitch motion and/or roll motion of the vehicle and an onboard diagnostics system communicably connected with the personal communication device enabling bi-directional communication. The personal communication device comprising a processor configured for geometric mapping of a three dimensional Cartesian coordinate of the three-axis accelerometer with the vehicle. The processor virtually orients the coordinates of three-axis accelerometer to coin- (Continued)

cide with the coordinates of the vehicle. The arbitrarily oriented three-axis accelerometer is configured to capture a road condition and a driver behavior using a sampling rate between 4 Hertz (Hz) to 10 Hertz (Hz). The system for the real-time prognosis of the vehicle, wherein the real-time prognosis utilizes at least one predictive analysis model to determine real-time prognosis for the said vehicle.

15 Claims, 4 Drawing Sheets (51) Int. Cl.
G07C 5/08 (2006.01)
B60W 50/14 (2012.01)
B60W 40/06 (2012.01)

(52) U.S. Cl.
CPC ..... *G07C 5/0808* (2013.01); *B60W 2420/905* (2013.01); *B60W 2520/14* (2013.01); *B60W 2520/16* (2013.01); *B60W 2520/18* (2013.01); *B60W 2550/14* (2013.01)

(56) References Cited

U.S. PATENT DOCUMENTS

| | | | |
|---|---|---|---|
| 7,533,569 B2 | 5/2009 | Sheynblat | |
| 7,630,802 B2 | 12/2009 | Breed | |
| 8,478,514 B2 | 7/2013 | Kargupta | |
| 8,566,010 B2 | 10/2013 | Sarma et al. | |
| 8,635,091 B2 | 1/2014 | Amigo et al. | |
| 2005/0273218 A1 | 12/2005 | Breed et al. | |
| 2009/0043441 A1 | 2/2009 | Breed | |
| 2009/0320123 A1* | 12/2009 | Yu | G06F 21/316 726/16 |
| 2010/0191356 A1 | 7/2010 | Wehrenberg et al. | |
| 2010/0318257 A1* | 12/2010 | Kalinadhabhotla | G01P 21/00 701/31.4 |
| 2011/0012720 A1 | 1/2011 | Hirschfeld | |
| 2011/0258044 A1 | 10/2011 | Kargupta | |
| 2011/0320111 A1 | 12/2011 | Sarma et al. | |
| 2012/0004882 A1 | 1/2012 | Sheynblat | |
| 2012/0053805 A1 | 3/2012 | Dantu | |
| 2012/0065871 A1 | 3/2012 | Deshpande et al. | |

OTHER PUBLICATIONS

Mednis et al., "Real Time Pothole Detection using Android Smartphone's With Accelerometers", 2011 International Conference on Distributed Computing in Sensor Systems and Workshops (DCOSS), 6 pages.

Ruta et al., "A Mobile Knowledge-based System for On-Board Diagnostics and Car Driving Assistance" UBICOMM 2010: The Fourth International Conference on Mobile Ubiquitous Computing, Systems, Services and Technologies, pp. 91-96.

Saxena, "Integrated Diagnosis and Prognosis Architecture for Fleet Vehicles Using Dynamic Case-Based Reasoning", 2005 IEEE, pp. 96-102.

STMicroelectronics, "Tilt measurement using a low-g 3-axis accelerometer" Apr. 2010, pp. 1-18.

\* cited by examiner

SYSTEM AND A METHOD FOR IMPROVED CAR PROGNOSIS

CROSS REFERENCE TO RELATED APPLICATIONS

This application is a U.S. National Phase Application of International Application No. PCT/IN2013/000133, filed Mar. 5, 2013, which claims priority to Indian Application No. 773/MUM/2012, filed Mar. 22, 2012, the content of both of which are incorporated herein by reference in their entireties.

FIELD OF THE INVENTION

The present invention relates to car prognosis system, more particularly the present invention relates to a system, a method, and an apparatus for real-time car prognosis using road condition, driver behaviour, and onboard diagnostics.

BACKGROUND OF THE INVENTION

Earlier, preventive maintenance for a vehicle largely relied on a visual inspection of the vehicle and its systems by a driver or an auto-mechanic, which invariably depended upon their experience. With development of electronic processors, vehicle diagnostic systems like onboard diagnostic system (OBD) for vehicle began to be widely used for fault-detection and scheduling vehicle maintenance. Currently the OBD systems are standard equipment on all the modern vehicles. The interfaces for current OBD system are governed by standards like SAE J1580 PWM/VPW, or ISO 15765 CAN, or SAE J2284-3. The information relating to the vehicle captured by the OBD play an important role in understanding factor affecting the performance of the vehicle and conditioning of the vehicle. At present the preventive maintenance are based on the historic OBD data collected and analysed by a model solely dependent on hardware of the vehicle.

With the introduction of freeways and speedways, the travel time reduced and commuting between places became easy. The use of freeways and speedways bought with it inherent need of continuous monitoring of the road condition, as a number of vehicle were travelling and at higher velocities. The road monitoring is essential because roadways and speedways are subjected to wear and tear, which hampers the travelling quality and in certain circumstances may result in irreparable harm.

The use of Global positioning systems (GPS) for assisting driver to plan his route also proved a viable solution for road monitoring, as the road condition became an important factor affecting the travel time and fuel management system. A modified apparatus comprising 3-axis accelerometer would provide the necessary inputs for determining the road condition. The apparatus needs to be oriented at a fixed position in order to compute the road conditions. Previously, the orientation correction was done using other supporting data/device such as magnetometer, gyroscope.

To overcome the limitation mentioned above US 2010/0318257 application discloses a method that calculates Euler's rotation angles and transforms the sampled values from a referred coordinate frame of a three-axis accelerometer device fixed to a vehicle to a reference coordinate frame of the vehicle. The method determines two rotation angles while the vehicle is stationary and assumed is not inclined with respect to gravity, so that only the transformed value corresponding to a vertical axis of the vehicle equals acceleration due to gravity. Then, data acquired from the sensors typically during a braking event and indicated by a vehicle diagnostic system, along with the other two rotation angles, are used in the first derivative of a second Euler's rotation equation to determine the remaining rotation angle. Data from the sensors is transformed by the three angles to the vehicle's coordinate frame and correlated with acceleration data derived from the diagnostic system to verify the rotation angles. The disclosure teaches the use of positioning system like GPS to capture the location of the vehicle and also takes into account the velocity of the vehicle to orient the accelerometer. The disclosure does not disclose the sampling frequency used to capture data.

A paper authored by Artis Mednis et. al. titled "Real Time Pothole Detection using Android Smartphone's With Accelerometers" discloses the use of a mobile sensing system for road irregularity detection using Android OS based smartphones. The paper discloses use the use of a fixed accelerometer and a sampling frequency of 100 Hertz (Hz) to capture the related data. The use of higher sampling frequency increases the battery consumption, as computation scales up with higher amount of data coming from high sampling rate.

US 2011/0012720 application filed by Robert Hirschfeld discloses a system that integrates a smart phone or personal communication device (PCD) to capture plurality of data relating to the vehicle. The data is captured by various sensors and system mounted in the vehicle and the smart phone. The application discloses method to capture data relating to driving behaviour and responses of vehicle systems to the driving behaviour without accounting for road condition, which also affect the prognosis of the vehicle. The application assumes the orientation of the accelerometer is fixed.

From the reference cited, there is a long felt need for a system, a method and a device that is configured to dynamically orient an accelerometer without using any external device, enabling the accelerometer to capture a wide variety of data. There is a need in the art to develop a system for real time prognosis of vehicle, which takes into account all the factors affecting the vehicle condition.

OBJECTS OF THE INVENTION

The principal object of the present invention is to provide a system configured to perform real time prognosis of vehicle.

Another object of the invention is to provide a system that utilizes an arbitrary oriented accelerometer to capture data for the real time prognosis of the vehicle.

Another object of the invention is to provide a method that dynamically corrects the orientation information of an accelerometer embedded in a personal communication device oriented arbitrary.

Yet another object of the invention is to provide an apparatus that captures a road condition of a road on which the vehicle is travelling.

Yet another object of the present invention is to provide an apparatus that is configured to capture driving behaviour for real time prognosis of the vehicle.

Yet another object of the present invention is to provide a system that enables a remote monitoring of the vehicle for real time prognosis of the vehicle.

Yet another object of the present invention is to provide a system that enables a remote monitoring of driving behaviour of a driver by a party having commercial interest.

Yet another object of the present invention is to provide a system, which utilizes a lower sampling rate to capture various data thereby reducing computation scale and conserving battery.

SUMMARY OF THE INVENTION

Before the present methods and apparatuses are described, it is to be understood that this invention is not limited to the particular apparatus and methodologies described, as there can be multiple possible embodiments of the present invention, which are not expressly illustrated, in the present disclosure. It is also to be understood that the terminology used in the description is for the purpose of describing the particular versions or embodiments only, and is not intended to limit the scope of the present invention, which will be limited only by the appended claims.

Present prognosis model and diagnostics model for a vehicle rely on data collected by onboard diagnostic (OBD) system. The OBD monitors the instantaneous condition, time for engine oil change, mechanical parts. The prediction for maintenance is based on historical OBD data analyzed by a model that is solely dependent on the hardware of the vehicle. These existing models do not take into account the road condition on which it is being driven or the way a driver maneuvers the vehicle. However, these parameters have a major effect on the condition of the vehicle. Therefore, in one aspect of the invention, a system is disclosed configured to perform a real time prognosis of a vehicle. The system integrates information/data captured by the onboard diagnostic system of the vehicle with information captured by microelectromechanical systems (MEMS) embedded in a smart phone or personal communication device (PCD). The MEMS usually embedded in a PCD are 3-axis accelerometer configured to capture rate of change of acceleration in any co-ordinate axis, and global position system (GPS) configured to capture the location.

In another aspect of the invention, the real time prognosis system integrating the PCD with OBD utilizes an arbitrary oriented 3-axis accelerometer to capture data relating to road condition and driver behaviour. The 3-axis accelerometer embedded in the PCD capture the data relating road condition that is distinguishes between a bump and a pothole. The 3-axis accelerometer also captures the driver behaviour that is, his response to said road condition, braking. A GPS embedded on a PCD can also be used to determine the location of the vehicle, so that the data relating to the road condition is shared with other drivers or subscriber.

The 3-axis accelerometer available in the smart phones or personal communication devices or electronic tablets currently used to monitor the road conditions, are either fixed or docked in a known orientation. At present, the orientation correction to capture data is done using supporting devices such as magnetometer, gyroscope, GPS along with the velocity of the vehicle. In addition, the current techniques use a sampling rate or sampling frequency of 25 Hertz (Hz) to 500 Hertz (Hz) with 256 to 1000 points to detect bump or potholes. The use of higher frequency produces larger sets of data requiring higher CPU cycles to process, which in effect requires higher battery consumption thereby reducing the power life of the devices. Therefore, in another aspect a method is provided that dynamically orients the 3-axis accelerometer without the use of any external devices such as magnetometer, gyroscope, or GPS. The 3-axis accelerometer according to said method can orients itself automatically before capturing data relating to road condition and driving behavior.

In another aspect of the present invention the 3-axis accelerometer utilizes a lower sampling rate/frequency about 4 Hertz (Hz) to 10 Hertz (Hz) to capture the data and only using four analysis points, hence reducing the battery consumption when compared to 256 or above analysis points.

The integration between data from the on-board diagnostic system of a vehicle and the sensors contained in a personal communication device or smart phone enables improved prognostic and diagnostic information to be provided to the driver. The data collected can be distributed to remote systems using the device's network connection for additional analysis and comparison. The data collected can be stored on a remote server or in cloud. The stored remote data can be used in aggregate or segregated by $3^{rd}$ parties to understand the driver's driving behaviour choices. Therefore, in yet another aspect of the present disclosure a system is provided that enables a remote monitoring of driving behaviour of a driver by a party having commercial interest for example an insurance company can monitor the driving style of driver and accordingly charge an insurance premium to him. Usually the premium is inversely proportional to the driving style of a driver that is the insurance premium charged to a good driver would be less compared to a bad driver.

BRIEF DESCRIPTION OF DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and product disclosed in the drawings.

DESCRIPTION OF THE INVENTION

Some embodiments of this invention, illustrating its features, will now be discussed:

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems, methods, apparatuses, and devices similar or equivalent to those described herein can be used in the practice or testing of embodiments of the present invention, the preferred, systems and parts are now described.

The disclosed embodiments are merely exemplary of the invention, which may be embodied in various forms.

Definitions of the Terms

The term vehicle refer to at least one element that can be selected from the group comprising of motor vehicle, automobile, personal transport vehicle, Automated guided vehicle, or self-propelled machines.

The term "personal communication device" refers to "PCD," or "smartphone," or "smart phone," or "mobile phone," or "cell phone," or "tablet" and essentially means the same.

In an exemplary embodiment of the present disclosure, a system is disclosed enabling real time prognosis of vehicles with an improved prognosis model. According to the said embodiment, the prognosis model captures a plurality of information related to a road condition on which the vehicle is being driven currently and driver behavior, that is driver response to the said road conditions apart from the conventionally captured information related to a vehicular systems.

The conventional information regarding the vehicle and its condition is captured by the onboard diagnostic system (OBD). The OBD stores the historic and current data related to the vehicle maintenance schedule. The OBD actively collects data from various systems like engine, tyres, brakes through the sensors mounted in these systems.

The said plurality of information related to the road condition and driver behavior is captured by an accelerometer embedded in a smartphone or personal communication device (PCD). The PCD is communicatively coupled with the OBD. The captured data from OBD and the PCD are analyzed using a prognosis model driven by data and hardware inputs. The prognosis model used is configured to generate desired results in situ or at remote location. To transfer the data captured at the remote location, PCD based communication network channel can be utilized. An application configured to generate the results in situ is embedded in the PCD.

Figure 1:
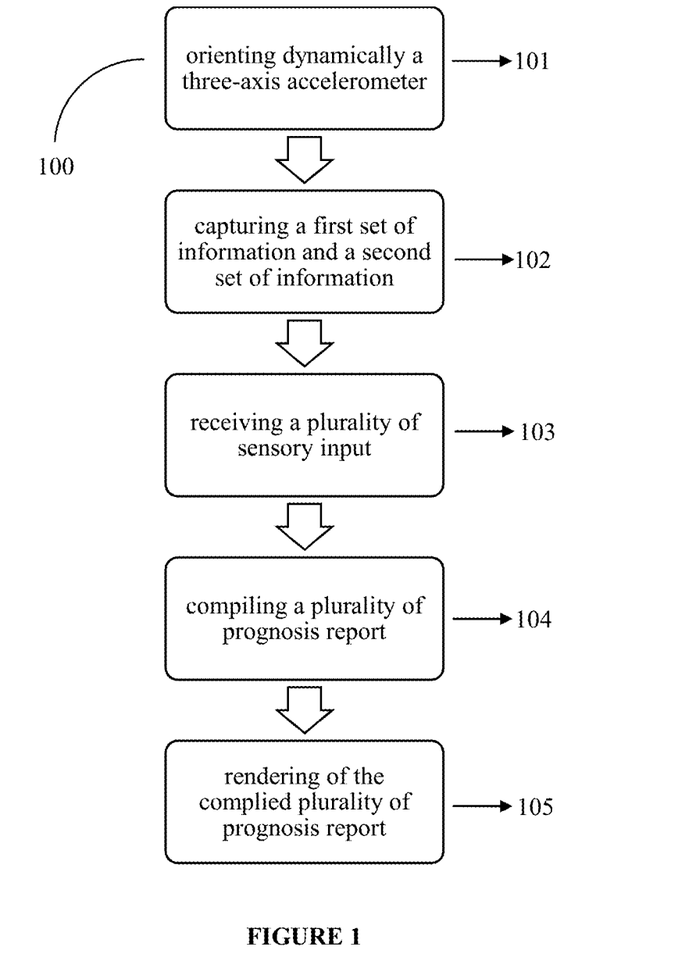
FIG. 1 illustrates a flow chart showing various steps involved in a method for real-time car/vehicle prognosis.

The FIG. 1 illustrates a flow chart showing various steps involved in a method for real-time car/vehicle prognosis. The real time vehicle prognosis starts with orienting dynamically a three-axis accelerometer (101) from an arbitrary position. The three-axis accelerometer utilized is either mounted in an electronic tablet or embedded in a personal communication device/smart phone or any portable devices. The three-axis accelerometer is oriented such that the Cartesian coordinates for each variation in a position of the personal communication device coincides with a reference coordinate assigned to the vehicle. The three-axis accelerometer automatically orients itself for each event case. An event case is defined as an event wherein change in acceleration is detected by the accelerometer on any of the coordinates. The method further comprises a step for capturing a first set of information and a second set of information (102). The said sets of information are captured by utilizing a sampling frequency between 4 Hertz (Hz) to 10 Hertz (Hz). The first set of information captured relates to a road condition, wherein the information provides an insight to the road anomalies on which the vehicles is being currently driven or has been driven in the past. The road anomalies detected by the three-axis accelerometer and contained in the first set of information refer to a pothole, a bump or a smooth surface. The said set of information is captured in a pre-defined sample window or time window. The sample window or time window is fixed at four points. To take care of the velocity effect, the feature value is scaled accordingly as with higher velocity small anomalies manifest as potholes and needs to be corrected for. In another embodiment, the mapping of velocity to time feature value is based on observation of trail data or historic data collected over a time span. A number of sample recorded in the said time window/sample window are counted.

The second set of information relates to the driver behaviour in the sample window. The driver behaviour relates to quantified data illustrating a driver's braking pattern, response to the road anomalies, and acceleration/deceleration pattern.

According to FIG. 1 the method further comprises of receiving a plurality of sensory input from an onboard vehicle diagnostic system (OBD) (103) that is communicably coupled to the device having the three-axis accelerometer. The said sensory inputs provide feedback from various vehicular systems on which a plurality of sensors are mounted which in turn are communicatively coupled to the OBD. The method further comprises of compiling a plurality of prognosis report (104). The prognosis report complied is based on a predictive analysis model/prognosis model that utilizes the first set of information and the second set of information captured in conjugation with the plurality of sensory inputs received. The prognosis model of such kind is driven by data and hardware unlike other prognosis model which are hardware driven, that is relying on hardware and historic data feedback only. The step (105) involves rendering of the complied plurality of prognosis report determined by the attributes of a user. The attributes of the user depend upon the role or profession of the user. The user can be an individual like driver of the vehicle, a mechanic catering to servicing of the vehicle, or a company like a party with commercial interest such as insurance.

According to an embodiment of the present disclosure, the prognosis report can be compiled in situ or on a remote server. The first set of information, second set of information and the plurality of sensory input are transmitted to the remote server via the communication network of the personal communication device, wherein this data is compiled and analysed using the prognosis model.

Figure 2:
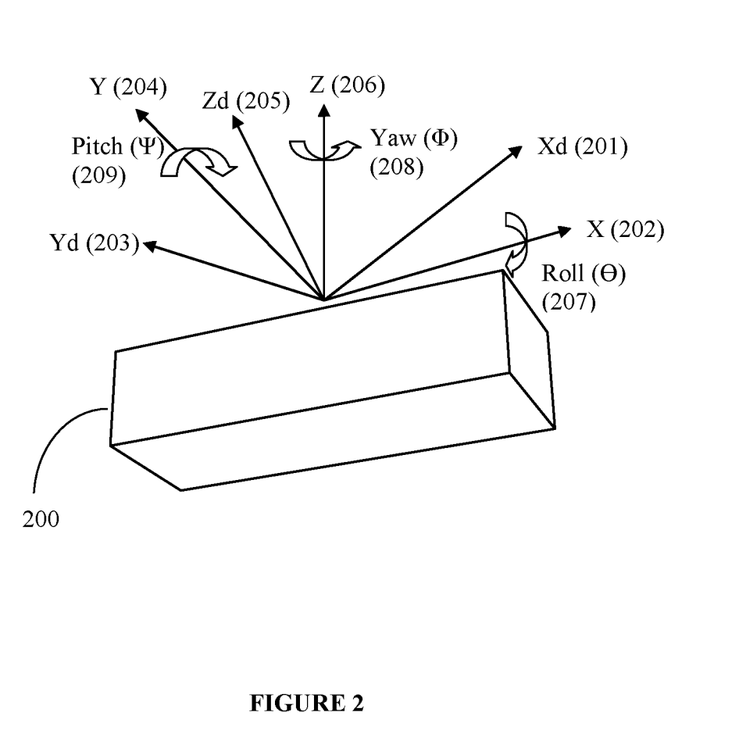
FIG. 2 illustrating a Cartesian coordinate block diagram.

Referring to FIG. 1, and FIG. 2 illustrating a Cartesian coordinate block diagram, the step for orienting dynamically the three-axis accelerometer (101) further comprises steps of assigning the reference coordinate (X, Y, Z) (202, 204, 206) for the vehicle (200). Wherein the X-coordinate (202) of the reference coordinate of the vehicle (200) refers to forward direction of the vehicle (200), Y-coordinate (204) refer to translational direction and Z-coordinate (206) refers to vertical direction. The step of orienting dynamically the three-axis accelerometer (101) further comprises assigning an initial coordinate to the three-axis accelerometer Xd (201), Yd (203), and Zd (205). With respect to a vehicle, the relation between X (202) and Xd (201) is termed as Roll (θ) (207). Similarly, relation between Y (204) and Yd (203) is Pitch (Ψ) (209) and between Z (206) and Zd (205) is yaw (Φ) (208).

The step of orienting dynamically the three-axis accelerometer (101) further comprises assigning or allocating a first intermediate coordinate to the arbitrarily oriented three-axis accelerometer in Cartesian coordinate format (Xo, Yo, Zo). Each of the first intermediate coordinate can be represented in an equation form wherein the equation is a summation of products of the at least three first scalar value with at least three distinct components. The equation for each coordinate can represented in a mathematical equation as follows:

$$Xo = C_1 g + C_2 Va + C_3 Rc$$

$$Yo = D_1 g + D_2 Va + D_3 Rc$$

$$Zo = E_1 g + E_2 Va + E_3 Rc$$

In the above equation, "g" is a physical constant for acceleration due to gravity. For practical purposes, the constant is 9.81 m/s2. C1, C2, C3, D1, D2, D3 and E1, E2, E3 are distinct scalar values and g, Va and Rc are vectors. The term "Va" represents the quantitative value of effect of change in velocity of the vehicle. "Rc" represents the effect of the road condition or road anomalies in a quantitative form. The method for orienting dynamically the three-axis accelerometer (101) further comprises of performing a first-degree derivation with respect to time on equation representing the first intermediate coordinate for each coordinate. To better understand the first-degree derivation, it can represented as follow:

$$\nabla Xo = C_2 \nabla Va + C_3 \nabla Rc$$

$$\nabla Yo = D_2 \nabla Va + D_3 \nabla Rc$$

$$\nabla Zo = E_2 \nabla Va + E_3 \nabla Rc$$

The method (101) further comprises of computing a second intermediate coordinate designated as (Xog, Yog, Zog), wherein the second intermediate coordinates (Xog, Yog, Zog) are estimated as a difference between the values of the first intermediate coordinates (Xo, Yo, Zo) and integrated value of the first degree of derivative of coordinate (Xo, Yo, Zo) respectively. Representing the statement in a mathematical equation as follow:

$$Xog = Xo - \int \nabla Xo$$

$$Yog = Yo - \int \nabla Yo$$

$$Zog = Zo - \int \nabla Zo$$

Further, for the orienting the three-axis accelerometer dynamically (101) roll ($\theta$) and pitch ($\Psi$) are calculated. In the present disclosure yaw ($\Phi$) is not calculated nor considered. To compute roll ($\theta$) a sine inverse of summation of values of Yog is divided by the product of gravitational acceleration and the number of sample recorded in the pre-defined sample window, expressed as follows:

$$\theta = \text{Sin}^{-1}\left(\frac{\sum Yog}{G*N}\right)$$

To compute pitch ($\Psi$) a sine inverse of summation of values of Xog is divided by the product of gravitational acceleration and the number of sample recorded in the pre-defined sample window, expressed as follows:

$$\theta = \text{Sin}^{-1}\left(\frac{\sum Xog}{G*N}\right)$$

Further, the method comprises of computing an angle ($\alpha$) between the Zd axis of initial coordinate and Z axis of the reference coordinate. The angle ($\alpha$) is computed as a cosine inverse of summation of values of Zog divided by the product of gravitational acceleration and the number of sample recorded. The equation representing the computing step is written as follows:

$$\alpha = \text{Cos}^{-1}\left(\frac{\sum Xog}{G*N}\right)$$

In the final step for orientating dynamically the three-axis accelerometer (101) the step comprises of computing a corrected coordinate and assigning coordinate as (Xcg, Ycg, Zcg). The computation of the corrected coordinate is based on the first-degree derivative for the each first intermediate coordinates (Xo, Yo, Zo) wherein the corrected coordinate (Xcg, Ycg) is computed as a difference of respective values of the second intermediate coordinates (Xog, Yog) and product of the gravitational acceleration with sine function of the roll ($\theta$) and the pitch ($\Psi$) and (Zcg) computed as a summation of values of intermediates coordinates and product of gravitational acceleration with difference of 1 minus cosine $\alpha$. Representing the mentioned statement in a mathematical equation as follow:

$$Ycg = Yoi - G*\text{Sin}(\theta)$$

$$Xcg = Xoi - G*\text{Sin}(\Psi)$$

$$Zcg = Zoi - G*(1 - \text{Cos}(\alpha))$$

Figure 3:
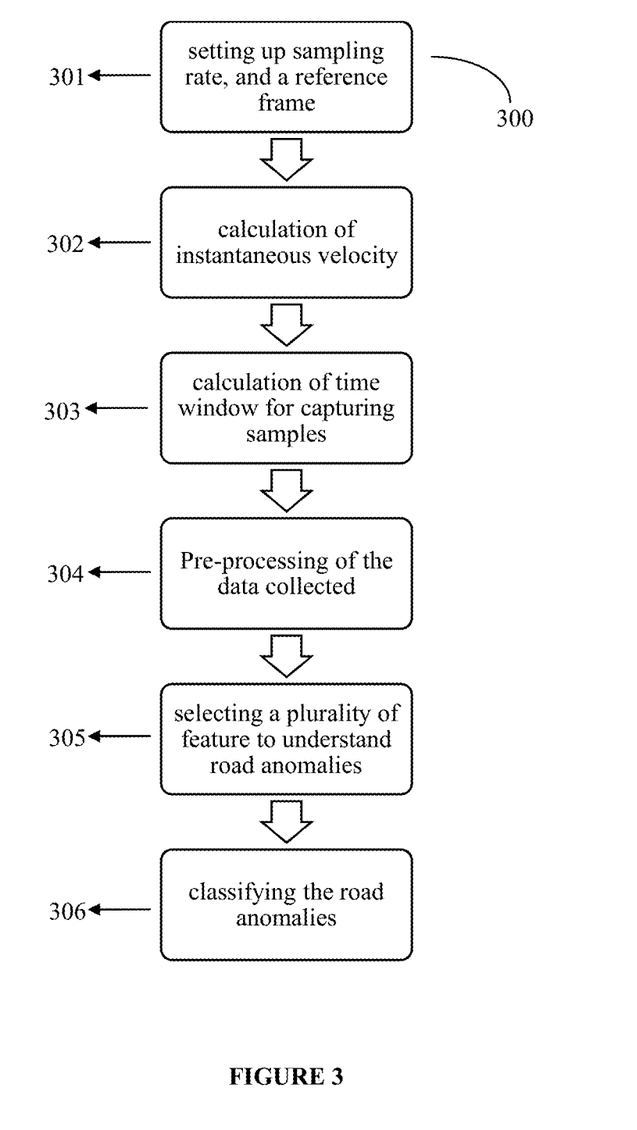
FIG. 3 illustrates a flow diagram for capturing road condition according to an embodiment.

FIG. 3 illustrates a flow diagram for capturing road condition according to an embodiment. According to present disclosure, a method for capturing road condition (300) comprises of setting up sampling rate, and a reference frame (301). In present disclosure a reference frame associated with the vehicle is such that x-axis points to forward direction of the vehicle, y-axis points to the left and z-axis points to vertical. The said method (300) further comprises of calculation of instantaneous velocity (302). Further, the method (300) comprises calculation of time window for capturing samples (303). The time window chosen is based on the instantaneous velocity of the vehicle, which is determined in an earlier step. Pre-processing of the data collected (304) by an accelerometer embedded in a PCD, wherein the data relates to road condition is the next step in the method (300). The pre-processing is a desired step as the three-axis accelerometer embedded in a PCD gives non-uniformly sampled data/collected data. Pre-processing of data is achieved by converting sampled data to a cubic spline for all coordinates axes; further, equally spaced data is taken from a resulting curve. The method (300) further comprises selecting a plurality of feature to understand road anomalies (305). The feature selection step further comprises of two steps involving calculation of first feature followed by second feature. The first feature primarily detects road anomalies a smooth road, a potholes and a rough road/bump. However, it cannot differentiate between the pothole and the bump. The first feature is calculated by calculating rate change of acceleration on Z-axis followed by energy calculation in a time domain. The total energy inside the window serves as the first feature. The above-mentioned step is represented in mathematical equation as follows:

$$\text{feature1}(t\_mean) = \sum_N \left(\frac{dz}{dt}\right)^2$$

Where, "N" is a total number of data points in the calculated time window, "z" represents the z-axis acceleration according to the reference frame and "t" defines the corresponding time instances. The quantity t_mean is determined by $$t\_mean = \frac{(window\_stop - window\_start)}{N}$$

Where "window_stop" and "window_start" defined the start and stop time of a time window.

To differentiate between the pothole and the bump the second feature is computed. The second feature is defined as the standard deviation of the ratio of summation of accelerations along x-axis and y-axis with acceleration along z-axis.

$$feature2(t\_mean) = std\left(\frac{|\vec{y} + \vec{x}|}{z}\right)$$

In the above equation $\vec{y}$ is acceleration in Y direction (Ycg), $\vec{x}$ is the acceleration in X direction (Xcg) and z is acceleration in Z direction (Zcg) and "std ( )" stands for standard deviation.

The method for capturing road condition (300) further comprises of classifying the road anomalies (306) as a good road, a rough road, a bumpy road, or a pothole road. The classification of road is based on an intuitive learning from historic data or advanced classifier. According to an embodiment of the present disclosure the classification of road is done basis of statistical analysis. The statistical analysis is done by combining a plurality of results capture from first feature and the second feature. The first feature is the energy of jerk is used to detect the road anomalies. The second feature is the ratio of sum of acceleration along X and Y with Z, which is used to distinguish between pothole and bumper.

Figure 4:
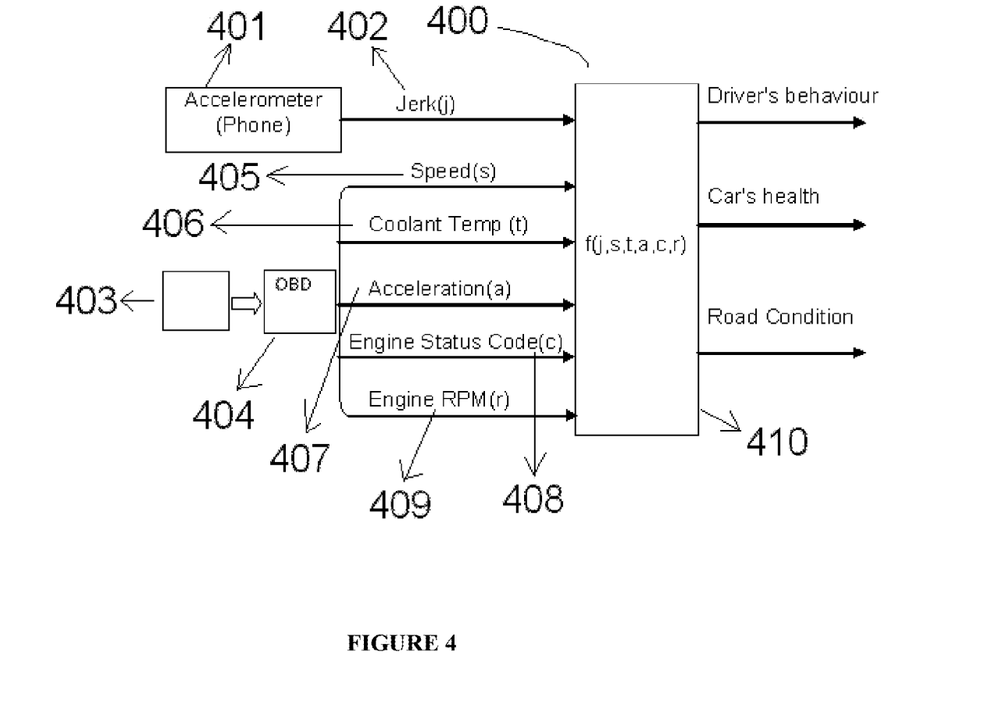
FIG. 4 illustrates a system for real time prognosis of a vehicle.

FIG. 4, illustrates a system for real time prognosis of a vehicle. The system for real-time vehicle (403) prognosis (400) is characterized by utilization of an arbitrarily oriented accelerometer (401) embedded in a personal communication device (401), adapted to capture road condition and driver behaviour. The road condition and driver behaviour captured are transformed into a quantifiable value like a jerk (402). The accelerometer utilizes a sampling frequency of around 4 Hertz (Hz) to 10 Hertz (Hz) to capture road condition and driver behavior by detecting a pitch motion, and/or roll motion of the vehicle. The system for real-time vehicle prognosis (400) further comprises of an onboard diagnostic (OBD) system (404) communicably connected to the personal communication device (401) and configured to receive inputs from a plurality of sensor mounted on the vehicle at predefined locations. In an exemplary embodiment of the present disclosure the sensors can speed sensor tracking the vehicle speed (405), or a temperature sensor sensing the temperature of the coolant cooling the engine and its components (406), or an acceleration sensor detecting sudden changes in vehicle acceleration or deceleration (407), or and engine status code that tracks Air/Fuel ratio or oxygen intake in manifold (408), or an engine RPM sensor monitoring the engine RPM (409). The captured road condition, driver behaviour and inputs from the plurality of sensor are analysed using an prognosis model (410). The analysis can be done on the personal communication device by embedding the prognosis model on the PCD or on a remote server which communicates with the PCD using the PCD's communication network. The analysis provides information regarding drivers behaviour, vehicle's health or road conditions. The information relating to driver behavior is important to an person having a commercial interest or for tracking in a parental role. Vehicles health information helps a mechanic or service manager to maintain the vehicle.

Advantages of the Invention

1. Use of improved prognosis model enabling effective preventive maintenance of the vehicle thereby reducing the cost.
2. Understanding a drivers behaviour and segregating them into safe, moderate and risky driver, thereby enabling to charge an insurance premium based on their segregation.
3. Storing and geo tagging the road conditions captured on a remote server, which can be accessed by an interested $3^{rd}$ party on a subscription basis.
4. Saving on CPU cycles which in effect reduces the power consumption of the device.

We claim:

1. A computer implemented method for real-time prognosis of a vehicle using a three axis accelerometer embedded in a personal communication device, the method comprising:

orienting dynamically the three axis accelerometer from an arbitrary position in a Cartesian coordinate for each variation in a position of the personal communication device to coincide with a reference coordinate assigned to the vehicle, wherein orienting dynamically the three axis accelerometer comprises the steps of:

assigning the reference coordinate (X, Y, Z) for the vehicle and storing said coordinate on a flash memory of the personal communication device;

assigning an initial coordinate (Xd, Yd, Zd) to the three axis accelerometer and storing said coordinate on the flash memory of the personal communication device;

computing first intermediate coordinates (Xo, Yo, Zo) using at least three first scalar values, at least three second scalar values and at least three third scalar values;

computing a first degree derivative for each of the first intermediate coordinates (Xo, Yo, Zo);

computing second intermediate coordinates (Xog, Yog, Zog);

computing a roll (θ) and pitch (Ψ) between the reference coordinate (X, Y, Z) and the initial coordinate (Xd, Yd, Zd) respectively, of the three axis accelerometer, wherein the roll (θ) is computed as a sine inverse of summation of values of the Yog divided by a product of gravitational acceleration and a number of samples recorded, and wherein the pitch (Ψ) is computed as a sine inverse of a summation of values of the Xog divided by the product of gravitational acceleration and a number of samples collected;

computing an angle (α) between the (Zd) coordinate of the initial coordinate (Xd, Yd, Zd) and the Z coordinate of the reference coordinate (X, Y, Z), wherein the angle (α) is computed as a cosine inverse of a summation of values of the Zog divided by the product of gravitational acceleration and the number of samples recorded;

computing a corrected coordinate (Xcg, Ycg, Zcg) for the three axis accelerometer based on the first degree derivative for each of the first intermediate coordinates (Xo, Yo, Zo);

assigning the computed corrected coordinate (Xcg, Ycg, Zcg) at each next dynamic instance of occurrence of an event case with the personal communication device;

capturing a first set of information relating to a road condition and a second set of information relating to a driver behaviour in a sample window and counting a number of samples recorded in the sample window using the dynamically oriented three axis accelerometer, wherein an instantaneous velocity of the vehicle determines the sample window;

receiving a plurality of sensory input from an onboard vehicle diagnostic system that is communicably coupled to the personal communication device;

compiling a plurality of prognosis reports based on at least one predictive analysis model utilizing the first set of information and the second set of information captured in conjugation with the plurality of sensory inputs received; and rendering the compiled plurality of prognosis reports determined by the attributes of a user.

2. The computer implemented method for real-time prognosis of the vehicle of claim 1, wherein the computing for the intermediate coordinate (Xo, Yo, Zo) is performed by summing a product of the at least three first scalar values with at least three distinct components for Xo, the at least three second scalar values with the at least three distinct components for Yo and the at least three third scalar values with the at least three distinct components for Zo, wherein the first scalar values, the second scalar values and the third scalar values are a function of the roll ($\theta$), the pitch ($\Psi$) and a yaw ($\Phi$) respectively.

3. The computer implemented method for real-time prognosis of the vehicle of claim 2, wherein the at least three distinct components consist of a gravitational acceleration, change of rate of velocity and road condition.

4. The computer implemented method for real-time detection for prognosis of the vehicle of claim 2, wherein the corrected coordinate (Zcg) for the three axis accelerometer with the respective coordinate of the vehicle is computed as a summation of values of intermediate coordinates and a product of gravitational acceleration with a difference of 1 minus cosine a.

5. The computer implemented method for real-time detection for prognosis of the vehicle of claim 1, wherein the first degree of derivative for each of the coordinates (Xo, Yo, Zo) is computed with respect to time.

6. The computer implemented method for real-time detection for prognosis of the vehicle of claim 1, wherein the second intermediate coordinates (Xog, Yog, Zog) are estimated as a difference between the values of the first intermediate coordinates (Xo, Yo, Zo) and an integrated value of the first degree derivative of coordinates (Xo, Yo, Zo) respectively.

7. The computer implemented method for real-time detection for prognosis of the vehicle of claim 1, wherein the corrected coordinate (Xcg, Ycg) for the three axis accelerometer is computed as a difference of respective values of the second intermediate coordinates (Xog, Yog) and the product of the gravitational acceleration with sine function of the roll ($\theta$) and the pitch ($\Psi$).

8. The computer implemented method for real-time detection for prognosis of the vehicle of claim 1, wherein the initial coordinate (Xd, Yd, Zd) of the three axis accelerometer is substituted with the corrected coordinate (Xcg, Ycg, Zcg) in the flash memory.

9. The computer implemented method for real-time prognosis of the vehicle of claim 1, wherein the capturing of the first set of information relating to the road condition further comprises:

detecting a road anomaly; and distinguishing between different detected road anomalies.

10. The computer implemented method for real-time prognosis of the vehicle of claim 9, wherein the road anomaly is detected by computing a rate change of acceleration on the Z coordinate followed by an energy calculation in a time domain.

11. The computer implemented method for real-time prognosis of the vehicle of claim 9, wherein the road anomaly detected is distinguished for a bump and a pothole by using a standard deviation of the ratio of summation of accelerations along the X coordinate and the Y coordinate with acceleration along the Z coordinate.

12. A computer implemented system for a real-time prognosis of a vehicle comprising:

a personal communication device comprising an arbitrarily oriented three axis accelerometer configured to capture a pitch motion and/or roll motion of the vehicle, wherein the personal communication comprises:

a processor configured for geometric mapping of a three dimensional Cartesian co-ordinate of the three-axis accelerometer with the vehicle, wherein the processor is further configured to dynamically orient the coordinates of the three-axis accelerometer to coincide with the coordinates of the vehicle, and wherein the coordinates of the three-axis accelerometer are dynamically oriented by:

assigning, by the processor, a reference coordinate (X, Y, Z) for the vehicle and storing said coordinate on a flash memory of the personal communication device;

assigning, by the processor, an initial coordinate (Xd, Yd, Zd) to the three axis accelerometer and storing said initial coordinate on the flash memory of the personal communication device;

computing, by the processor, first intermediate coordinates (Xo, Yo, Zo) using at least three first scalar values, at least three second scalar values and at least three third scalar values;

computing, by the processor, a first degree derivative for each of the first intermediate coordinates (Xo, Yo, Zo);

computing, by the processor, second intermediate coordinates (Xog, Yog, Zog);

computing, by the processor, a roll ($\theta$) and pitch ($\Psi$) between the reference coordinate (X, Y, Z) and the initial coordinate (Xd, Yd, Zd) respectively, of the three axis accelerometer, wherein the roll ($\theta$) is computed as a sine inverse of a summation of values of the Yog divided by a product of gravitational acceleration and a number of samples recorded, and wherein the pitch ($\Psi$) is computed as a sine inverse of a summation of values of the Xog divided by the product of gravitational acceleration and a number of samples collected;

computing, by the processor, an angle ($\alpha$) between the (Zd) coordinate of the initial coordinate (Xd, Yd, Zd) and the Z coordinate of the reference coordinate (X, Y, Z), wherein the angle ($\alpha$) is computed as a cosine inverse of a summation of values of the Zog divided by the product of gravitational acceleration and the number of samples recorded;

computing, by the processor, a corrected coordinate (Xcg, Ycg, Zcg) for the three axis accelerometer based on the first degree derivative for each of the first intermediate coordinates (Xo, Yo, Zo);

assigning, by the processor, the computed corrected coordinate (Xcg, Ycg, Zcg) at each next dynamic instance of occurrence of an event case with the personal communication device; and an onboard diagnostics (OBD) system communicably connected with the personal communication device enabling bi-directional communication, wherein the onboard diagnostic system captures vehicular data.

13. The computer implemented system for the real-time prognosis of the vehicle of claim 12, wherein the arbitrarily oriented three-axis accelerometer is configured to capture a road condition and a driver behaviour using a sampling rate between 4 Hertz (Hz) and 10 Hertz (Hz).

14. The computer implemented system for the real-time prognosis of the vehicle of claim 13, wherein the road condition captured by the three-axis accelerometer is converted into statistical data by utilizing an energy of jerk on a settling time vibration spectrum of the vehicle.

15. The computer implemented system for the real-time prognosis of the vehicle of claim 12, wherein the real-time prognosis utilizes at least one predictive analysis model to determine real-time prognosis for the vehicle.

* * * * *